US008056423B2

(12) United States Patent
Abdallah et al.

(10) Patent No.: US 8,056,423 B2
(45) Date of Patent: Nov. 15, 2011

(54) SENSING THE TENDON TENSION THROUGH THE CONDUIT REACTION FORCES

(75) Inventors: Muhammad E. Abdallah, Houston, TX (US); Lyndon Bridgwater, Houston, TX (US); Myron A. Diftler, Houston, TX (US); Douglas Martin Linn, White Lake, MI (US); Charles W. Wampler, II, Birmingham, MI (US); Robert Platt, Houston, TX (US)

(73) Assignees: GM Global Technology Operations LLC, Detroit, MI (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 528 days.

(21) Appl. No.: 12/269,552

(22) Filed: Nov. 12, 2008

(65) Prior Publication Data

US 2010/0121222 A1    May 13, 2010

(51) Int. Cl.
*G01N 3/08* (2006.01)
(52) U.S. Cl. .................................................. 73/826
(58) Field of Classification Search ............. 73/826; 600/587
See application file for complete search history.

(56) References Cited

U.S. PATENT DOCUMENTS

| 5,004,391 | A  | * | 4/1991 | Burdea ........................... 414/6 |
| 5,912,658 | A  | * | 6/1999 | Bergamasco et al. ........ 345/156 |
| 6,059,506 | A  | * | 5/2000 | Kramer ........................... 414/5 |
| 6,110,130 | A  | * | 8/2000 | Kramer ......................... 600/595 |
| 6,413,229 | B1 | * | 7/2002 | Kramer et al. ................ 600/595 |

\* cited by examiner

*Primary Examiner* — Lisa Caputo
*Assistant Examiner* — Octavia Davis
(74) *Attorney, Agent, or Firm* — John A. Miller; Miller IP Group, PLC

(57) ABSTRACT

A technique that determines the tension in a tendon using a conduit reaction force applied to an end of a conduit through which the tendon is threaded. Any suitable tendon tension sensor can be employed that uses the conduit reaction force for this purpose. In one non-limiting embodiment, the tendon tension sensor includes a cylindrical strain gauge element and a force member mounted to an end of the conduit. The force member includes a cylindrical portion having a bore and a plate portion, where the cylindrical portion is inserted into a bore in the strain gauge element. The tendon is threaded through the strain gauge element and the force member. A strain gauge is mounted to the strain gauge element and measures the reaction force when tension on the tendon causes the strain gauge element to be pushed against the force member.

20 Claims, 3 Drawing Sheets

SENSING THE TENDON TENSION THROUGH THE CONDUIT REACTION FORCES

RESEARCH OR DEVELOPMENT

The invention described herein may be manufactured and used by or for the U.S. Government for U.S. Government (i.e., non-commercial) purposes without the payment of royalties thereon or therefore.

BACKGROUND OF THE INVENTION

1. Field of the Invention

This invention relates generally to a tendon tension sensor for measuring the tension on a tendon using conduit reaction forces on a conduit through which the tendon is threaded and, more particularly, to a tendon tension sensor for measuring the tension on a tendon in a robotic hand, where the sensor is mounted to an end of a conduit that the tendon is threaded through and where the sensor measures conduit reaction forces on the conduit.

2. Discussion of the Related Art

Dexterous robot systems are known in the art that perform a variety of functions. A dexterous robot system typically includes a robotic arm having a robotic hand with fingers and related joints that operate to grasp an object or part for a particular application. In one dexterous robot system design, tendons are employed to actuate the fingers where the tendons are coupled to the finger joints. The actuators that actuate the tendons to move the fingers are typically positioned within the forearm area of the robotic arm. Tendons extend from the actuators to the finger joints, where they are attached. Typically, it takes two tendons to actuate a single joint of the finger, one tendon to close the finger and another tendon to open the finger.

The tendons are sometimes threaded through a conduit that isolates the joint actuation from configuration changes occurring between the actuator and the joint. The conduit applies reaction forces to its support structure that serves to counter the tendon forces. This keeps the actuator joint forces from interfering with upstream joints in response to torque provided by the joint. Further, the conduit maintains the length of the tendon constant. Thus, if the wrist of the robotic arm moves, the conduit maintains the length of the tendon constant so that the fingers do not move.

To close the loop on a robotic finger force control, feedback is needed for the tendon tension. Directly sensing the tendon tension has proven to be challenging. Several factors contribute to this challenge including providing a location downstream of a major friction force, where space in the downstream robotic assembly, typically a robotic palm, is severally limited. Further, the tendon is not stationary.

One known technique for measuring tension in a robotic tendon employs a strain gauge sensor for measuring the tensile deformation of the tendon. However, the range of tensile forces that are encountered in robotic applications may be so small that strain gauge sensors may not be sensitive enough to provide an accurate measurement. Also, the strain gauge sensor doesn't measure the deformation of the tendon, but employs a strain element to introduce a bend in the tendon so that a greater tendon tension results in a greater strain in the element. However, there is typically not enough space for such a sensor.

It is also known in the art to use load cells to measure tension. However, commercially available load cells typically are too large for robotic applications in that they cannot be adequately housed inside of a robotic arm.

Another known design employs an S-shaped elastic element on which a strain gauge is mounted. An end of a tendon is coupled to one end of the S-shaped element and an end of another tendon is coupled to an opposite end of the S-shaped element so that tension on the tendon causes the S-shaped element to deform. This design requires cutting the tendon and the element has a relatively large diameter. This design also presents a problem of lack of space as well as having wires hanging in space attached to a moving piece.

SUMMARY OF THE INVENTION

In accordance with the teachings of the present invention, a technique is disclosed that determines the tension in a tendon using a conduit reaction force applied to a conduit through which the tendon is threaded. Any suitable tendon tension sensor can be employed that uses the conduit reaction force for this purpose. In one non-limiting embodiment, the tendon tension sensor includes a cylindrical strain gauge element and a force member mounted to an end of the conduit. The force member includes a cylindrical portion having a bore and a plate portion, where the cylindrical portion is inserted into a bore in the strain gauge element. The tendon is threaded through the strain gauge element and the force member. A strain gauge is mounted to the strain gauge element and measures the reaction force when tension on the tendon causes the strain gauge element to be pushed against the force member.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a tendon tension sensor for a robotic arm that measures a reactive force on a conduit through which the tendon is threaded is merely exemplary in nature, and is in no way intended to limit the invention or its applications or uses. For example, the present invention has application to measure the tension on a tendon in a robotic arm. However, as will be appreciated by those skilled in the art, the tendon tension sensor will have other application.

Figure 1:
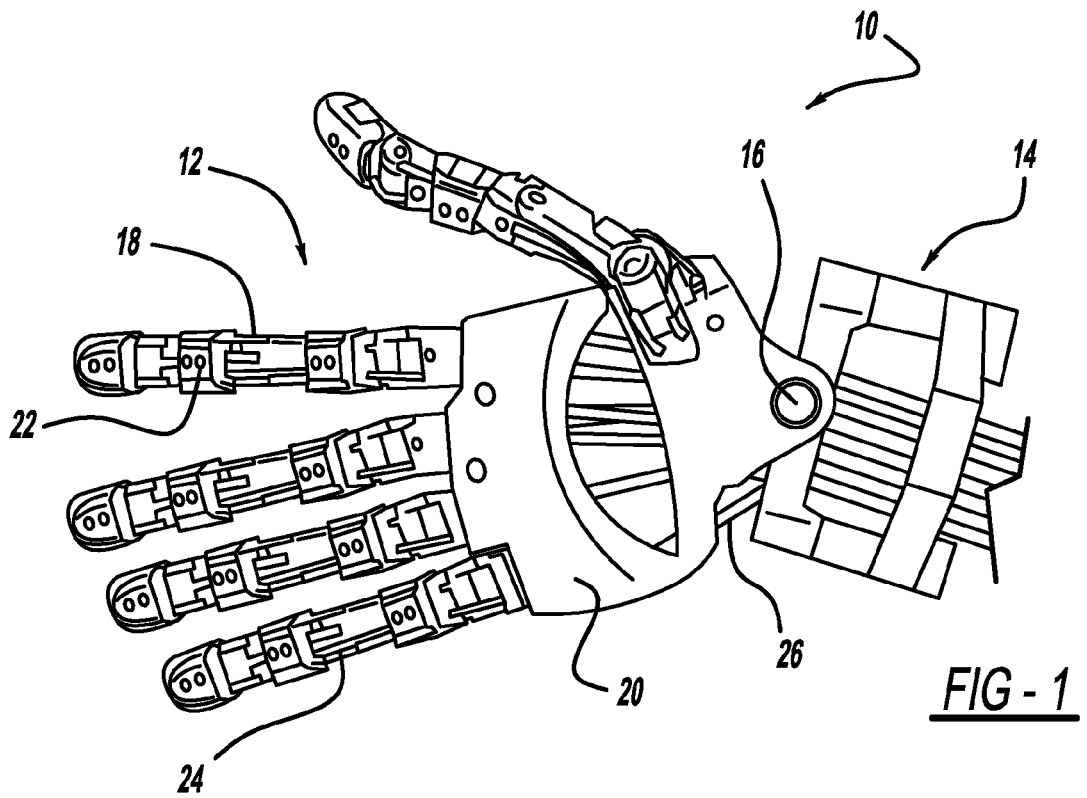
FIG. 1 is a perspective view of a robotic hand and wrist showing tendons threaded through conduits that actuate fingers of the robotic hand.

FIG. 1 is a perspective view of part of a robotic arm 10 including a robotic hand 12 and a robotic wrist 14 pivotable relative to each other by a pivot joint 16. The robotic hand 12 includes robotic fingers 18 and a robotic palm 20. The robotic fingers 18 include a plurality of joints 22 that are actuatable to allow the robotic hand 12 to grasp certain components, as is well understood in the art. Tendons 24 are coupled to the joints 22 and are actuatable by a suitable actuator (not shown), such as a motor, that pulls on the tendon 24 to close or open the joints 22. Each tendon 24 extends through a conduit 26 of the type discussed above where the conduits 26 extend through the wrist 14 and the palm 20, as shown. The operation of a robotic arm in this configuration is well understood to those skilled in the art.

Figure 2:
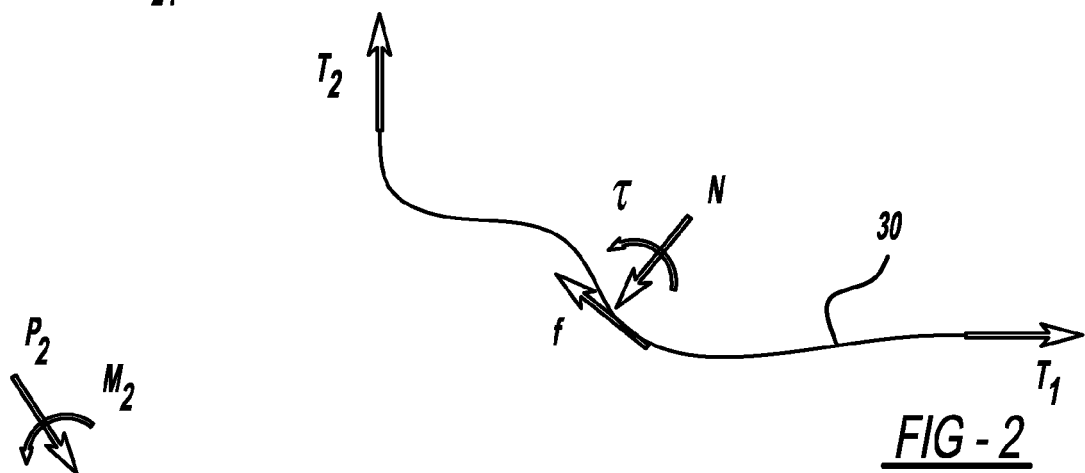
FIG. 2 is a free-body diagram of a tendon.
Figure 3:
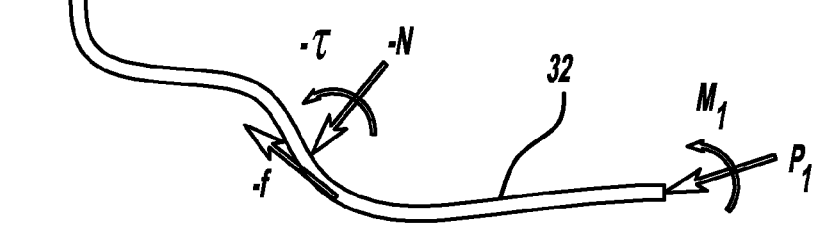
FIG. 3 is a free-body diagram of a conduit through which the tendon is threaded.

FIG. 2 is a free-body diagram of a cable 30 and FIG. 3 is a free-body diagram of a conduit 32 intended to represent the tendon 24 and the conduit 26, respectively. These free-body diagrams show that a local conduit reaction force $P_i$ on the end of the conduit 32 accurately predicts the corresponding local tendon tension $T_i$ on the tendon 30 in both direction and magnitude. This approximation increases in accuracy as the tension load increases. Thus, what these diagrams show, and what is proposed by the present invention, is that the conduit reaction force $P_i$ in response to tension on the tendons 24 can be used as a technique for measuring the tendon tension in the robotic arm 10.

Figure 4:
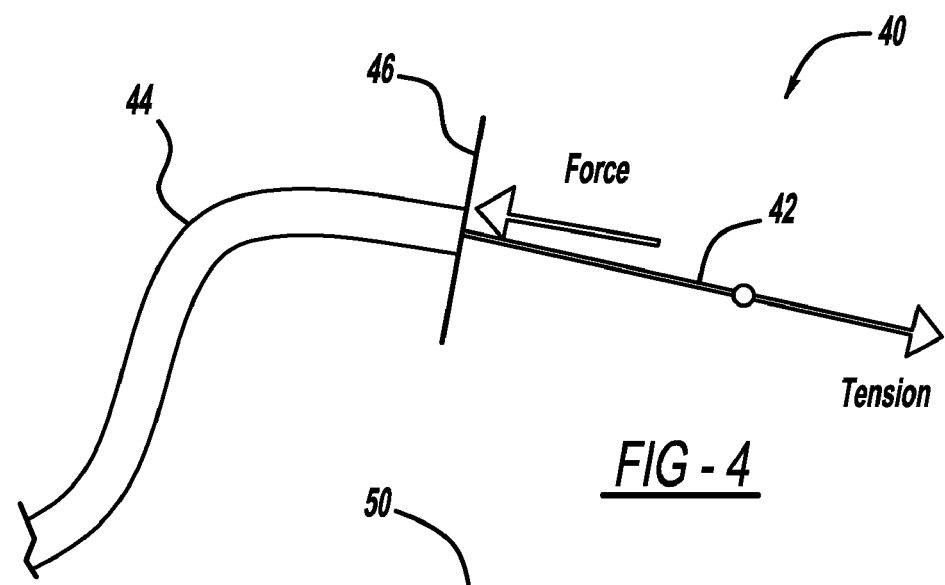
FIG. 4 is a plan view of a force applied to a conduit in response to tension on a tendon that is threaded through the conduit.

FIG. 4 shows a force diagram 40 including a tendon 42 threaded through a conduit 44 that illustrates the conduit reaction force referred to above. Particularly, a pulling force on the tendon 42 as a result of actuation of the tendon 42 to move a robotic joint causes a reaction force at an end of the conduit 44 on a plate 46.

The present invention proposes a technique that determines the tension in a tendon using the conduit reaction force applied to a conduit through which the tendon is threaded. Any suitable tendon tension sensor can be employed that uses the conduit reaction force for this purpose.

Figure 5:
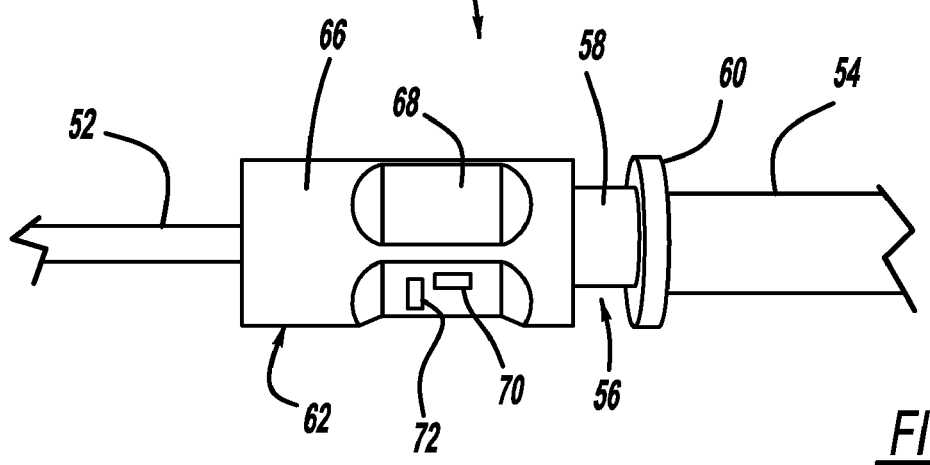
FIG. 5 is a perspective view of a tendon tension sensor mounted to a cable.
Figure 6:
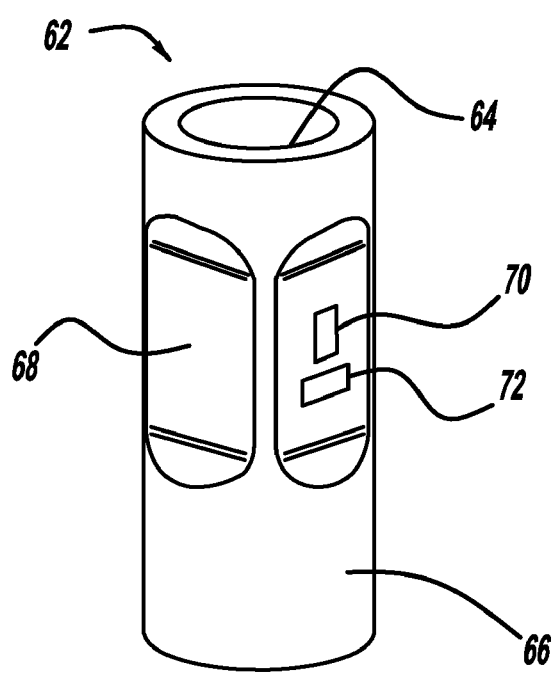
FIG. 6 is a perspective view of a strain gage element associated with the sensor shown in FIG. 5.

FIG. 5 is a perspective view of a tendon tension sensor 50 that measures the tension on a tendon 52 threaded through a conduit 54 using the conduit reaction force discussed above, as one suitable non-limiting embodiment. The tension sensor 50 includes a cylindrical force piece 56 threaded or otherwise mounted an end of the conduit 54. The force piece 56 includes a cylindrical portion 58 and a force plate 60. A cylindrical strain gauge element 62 having an internal bore 64 is mounted to the force piece 56 by sliding the cylindrical portion 58 into the bore 64. FIG. 6 is a perspective view of the strain gauge element 62 separated from the sensor 50. The strain gauge element 62 includes a cylindrical body member 66 having four symmetrical scallop portions 68 carved out of the sides of the body member 66. A pair of strain gauges 70 and 72 is positioned on one of the scallop portions 68 where the strain gauge 70 measures strain in a longitudinal direction and the strain gauge 72 measures strain in a transverse direction. Thus, a tension force on the tendon 52 pulls the force piece 56 into the strain gauge element 62 causing compression of the strain gauge element in response to the conduit reaction force, which is measured by the strain gauges 70 and 72. The strain gauges 70 and 72 provide an electrical signal on wires (not shown) identifying the tension. As discussed above, the conduit reaction force is an accurate prediction of the tension of the tendon 52.

Figure 7:
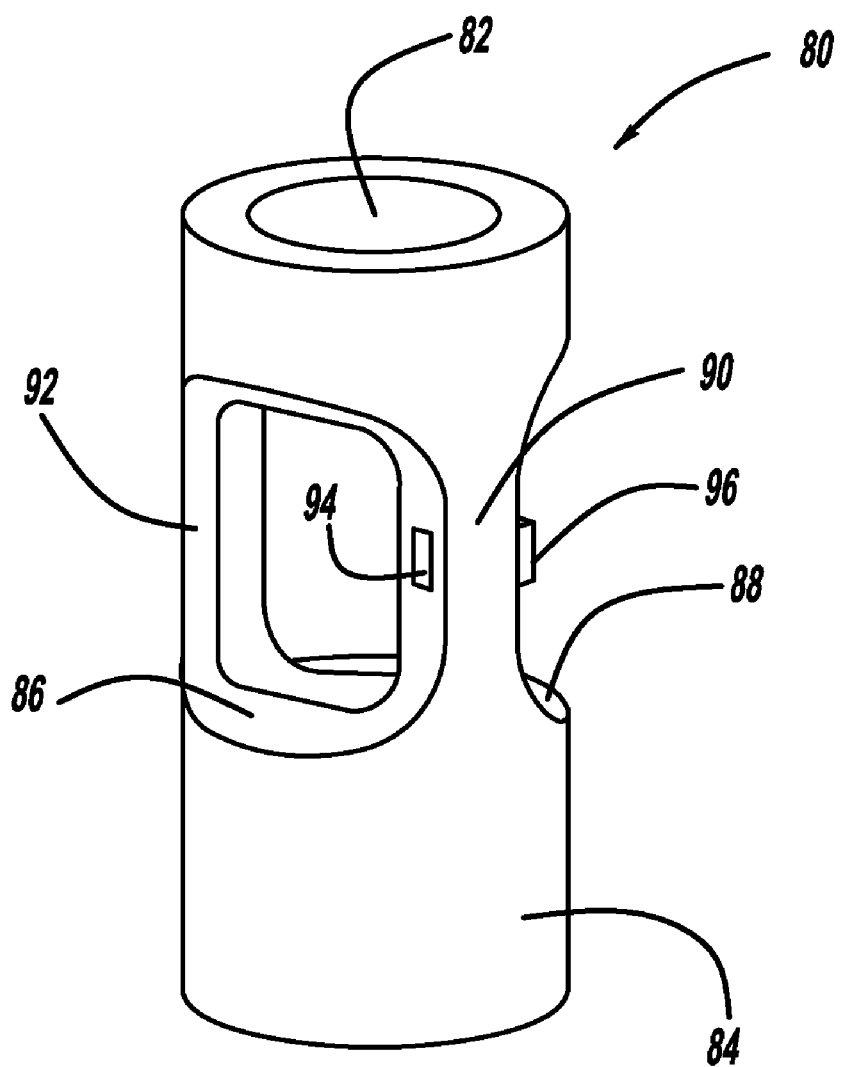
FIG. 7 is a perspective view of another strain gage element for a tendon tension sensor.

FIG. 7 is a perspective view of a strain gauge element 80 that can replace the strain gauge element 62, according to another embodiment. The strain gauge element 80 includes an internal bore 82 that accepts the element 56 as discussed above. The strain gauge element 80 also includes a cylindrical body member 84 having opposing cut-out portions 86 and 88 that are in communication with the internal bore 82. The cut-out portions 86 and 88 define opposing pillars 90 and 92. Strain gauges 94 and 96 are mounted on opposite sides of the pillar 90.

Tension on the tendon 52 provides an axial load that is converted into a bending moment through the off-centered pillar 90. The bending moment creates a surface in compression and a surface in extension. The strain gauges 94 and 96 measure the compression force and the extension force. This doubles the signal strength and achieves temperature compensation without extra off-access gages. Both of the mounted surfaces lie within a cylindrical envelope provided by the element 80 that protects the gauges 94 and 96 from physical contact with the palm 20.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A sensor for measuring tension on a tendon, said tendon extending through a conduit and out an end therefrom, said sensor comprising:
a force element including a cylindrical portion and a plate portion mounted to the end of the conduit, said cylindrical portion including an internal bore, said tendon extending through the internal bore of the cylindrical portion; and
a strain gauge element including a cylindrical body having an internal bore, said cylindrical portion of the force element being inserted into the internal bore of the cylindrical body of the strain gauge element, said tendon also extending through the internal bore of the cylindrical element, said strain gauge element including at least one strain gauge mounted thereto, said at least one strain gauge measuring a conduit reaction force at the end of the conduit caused by the strain gauge element pushing against the plate portion in response to tension on the tendon.

2. The sensor according to claim 1 wherein the strain gauge element includes cut-out portions in the cylindrical body that define opposing pillars where the at least one strain gauge is mounted to one of the pillars.

3. The sensor according to claim 2 wherein the at least one strain gauge is two strain gauges mounted to opposite sides of one of the pillars where one of the strain gauges measures a compression and the other strain gauge measures extension in response to a bending motion on the strain gauge element from the conduit reaction force.

4. The sensor according to claim 1 wherein the strain gauge element includes flattened portions in the cylindrical body, said at least one strain gauge being mounted to one of the flattened portions in the cylindrical body.

5. The sensor according to claim 4 wherein the at least one strain gauge is two strain gauges mounted to a flattened portion and oppositely oriented to measure strain in opposite directions in the strain gauge element.

6. The sensor according to claim 1 wherein the tendon is a tendon in a robotic hand that moves a robotic finger joint.

7. A sensor for measuring tension on a tendon in a robotic hand, said tendon extending through a conduit in the robotic hand and out an end therefrom into a robotic finger in the hand, said sensor comprising:
a force element mounted to the end of the conduit, said tendon extending through the force element; and a strain gauge element mounted to the force element, said tendon extending through the strain gauge element, said strain gauge element including at least one strain gauge mounted thereto, said at least one strain gauge measuring a conduit reaction force at the end of the conduit caused by the strain gauge element pushing against the force element in response to tension on the tendon.

8. The sensor according to claim 7 wherein the force element includes a cylindrical portion and a plate portion, said cylindrical portion including an internal bore through which the tendon extends.

9. The sensor according to claim 7 wherein the strain gauge element includes a cylindrical body having an internal bore through, which the tendon extends.

10. The sensor according to claim 9 wherein the strain gauge element includes cut-out portions in the cylindrical body that define opposing pillars where the at least one strain gauge is mounted to one of the pillars.

11. The sensor according to claim 10 wherein the at least one strain gauge is two strain gauges mounted to opposite sides of one of the pillars where one of the strain gauges measures a compression and the other strain gauge measures extension in response to a bending motion on the strain gauge element from the conduit reaction force.

12. The sensor according to claim 9 wherein the strain gauge element includes flattened portions in the cylindrical body, said at least one strain gauge being mounted to one of the flattened portions in the cylindrical body.

13. The sensor according to claim 12 wherein the at least one strain gauge is two strain gauges mounted to a flattened portion and oppositely oriented to measure strain in opposite directions in the strain gauge element.

14. A sensor for measuring tension on a tendon, said tendon extending through a conduit and out an end therefrom, said sensor comprising a force element mounted to the end of the conduit, said force element being responsive to a conduit reaction force at the end of the conduit in response to tension on the tendon, said sensor measuring the conduit reaction force.

15. The sensor according to claim 14 further comprising a strain gauge element mounted to the force element, said strain gauge element including at least one strain gauge mounted thereto, said at least one strain gauge measuring the conduit reaction force at the end of the conduit caused the by the strain gauge element pushing against the force element in response to the tension on the tendon.

16. The sensor according to claim 15 wherein the force element includes a cylindrical portion and a plate portion, said cylindrical portion including an internal bore, said tendon extending through the internal bore of the cylindrical portion.

17. The sensor according to claim 16 wherein the strain gauge element includes a cylindrical body having an internal bore, said cylindrical portion of the force element being inserted into the cylindrical bore of the cylindrical body of the strain gauge element, said tendon also extending through the internal bore of the cylindrical body.

18. The sensor according to claim 17 wherein the strain gauge element includes cut-out portions in the cylindrical body that define opposing pillars where the at least one strain gauge is mounted to one of the pillars.

19. The sensor according to claim 18 wherein the at least one strain gauge is two strain gauges mounted to opposite sides of one of the pillars where one of the strain gauges measures a compression and the other strain gauge measures extension in response to a bending motion on the strain gauge element from the conduit reaction force.

20. The sensor according to claim 17 wherein the strain gauge element includes flattened portions in the cylindrical body, said at least one strain gage being mounted to one of the flattened portion in the cylindrical body.

* * * * *